(No Model.)

A. B. BAUGHART & C. H. TREAT.
METHOD OF MAKING INLAID FRAMES.

No. 274,898. Patented Apr. 3, 1883.

WITNESSES:
Chas. Nida.
C. Sedgwick.

INVENTOR:
A. B. Baughart
C. H. Treat
BY Munn & Co.
ATTORNEYS.

UNITED STATES PATENT OFFICE.

ANDREW B. BAUGHART AND CHARLES H. TREAT, OF FRANKFORD, DEL.

METHOD OF MAKING INLAID FRAMES.

SPECIFICATION forming part of Letters Patent No. 274,898, dated April 3, 1883.

Application filed July 1, 1882. (No model.)

*To all whom it may concern:*

Be it known that we, ANDREW B. BAUGHART and CHARLES H. TREAT, of Frankford, in the county of Sussex and State of Delaware, have invented a new and Improved Method of Making Inlaid Frames, of which the following is a full, clear, and exact description.

Reference is to be had to the accompanying drawings, forming a part of this specification, in which similar letters of reference indicate corresponding parts in all the figures.

Figures 1 to 8, inclusive, are perspective views illustrating the successive steps of the process.

The object of this invention is to produce inlaid frames constructed in such a manner that the edges of the veneers forming the frames will be exposed to view upon all four edges of the frames.

Figure 1:
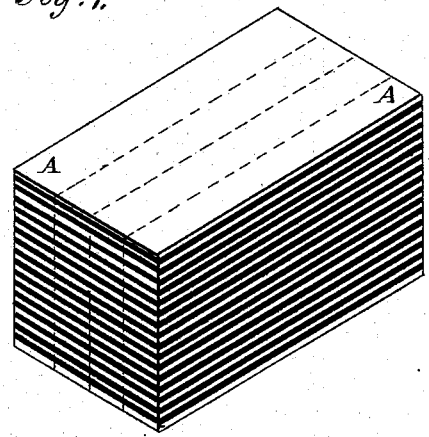
Figure 2:
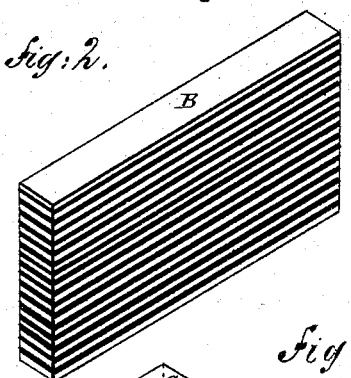
Figure 3:
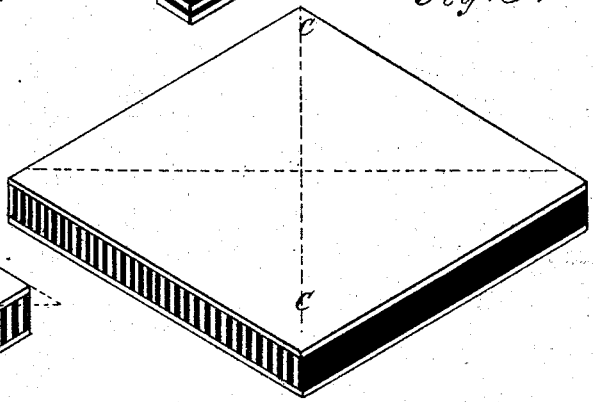
Figure 4:
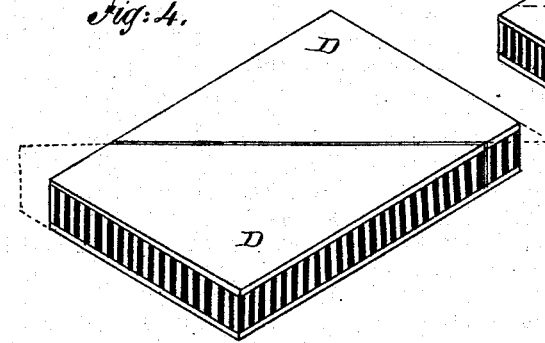
Figure 5:
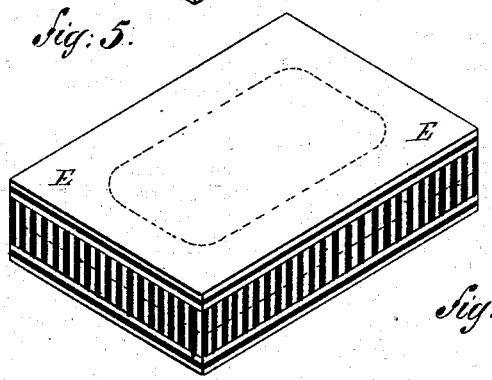
Figure 6:
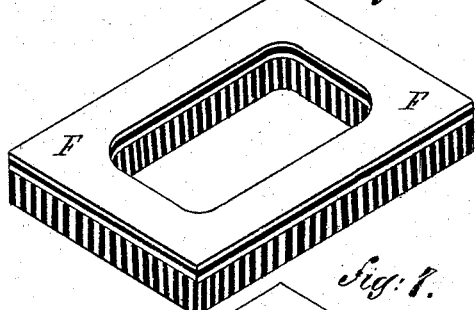
Figure 7:
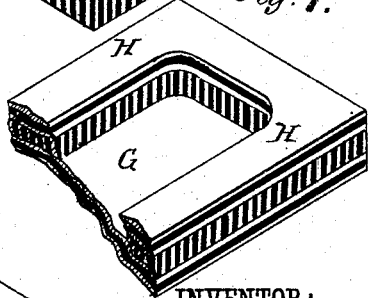
Figure 8:
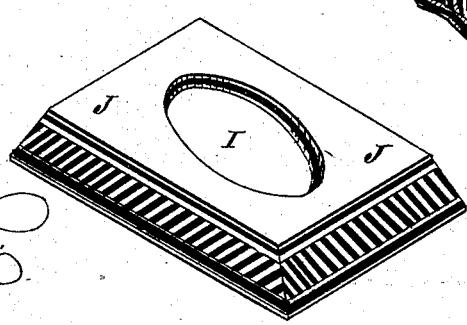

In carrying our invention into practical effect we first build up a block, A, of veneers of any desired size, using light and dark woods alternately, as shown in the drawings. The block A is then cut into strips B, of any desired thickness, by sawing the said blocks across the veneers, as indicated in dotted lines in Fig. 1. Two or more of the strips B are then glued together, edge to edge, to form a square block of the required size, and one or more thicknesses of veneer are glued to the side faces of the said block, producing the block C shown in Fig. 3. The block C is then sawed diagonally into four triangular pieces, as indicated by dotted lines in Fig. 3, and these pieces are arranged in pairs by placing them base to base and gluing them together. By slipping the triangular blocks upon each other before gluing, as shown in Fig. 4, a rectangular block, D, is formed, and one or more sheets of veneer are glued to the opposite sides of the said block D, forming the completed block E. The middle part of the block E is then sawed out, as indicated in dotted lines in Fig. 5, and the said block is then sawed into two equal blocks, F, one of which is shown in Fig. 6, and one or more thicknesses of veneer, G, are glued to the side of the block F, to cover the edges of the veneers exposed upon one side of the said block F, producing the block H shown in Fig. 7. The edges of the block H are then beveled, and an opening, I, of oval or other desired shape, is sawed through the veneer G, producing the frame J shown in Fig. 8. By omitting to form the opening I a tablet for ornamentation will be produced. In the case of large frames the block cut from the middle part of the block E can be used for forming smaller frames. With this method of construction there will be very little waste of stock, and the edges of the veneers will be exposed upon all the four edges of the frame—an effect which has been hitherto unattainable. With this construction the frames and tablets can be made rectangular, round, or oval, as may be desired.

Having thus described our invention, we claim as new and desire to secure by Letters Patent—

The method of making inlaid frames, substantially as herein shown and described, which consists in forming a block, A, of veneers, cutting the block into strips, gluing the strips edge to edge, and gluing veneers to the sides of the strips, forming a block, C, sawing the block C diagonally into triangular sections, gluing the triangular sections back to back in pairs D, gluing veneers to the sides of the block D, cutting out the middle part of the block E, and sawing the said block into two plates, and gluing veneers to the exposed side edges of the veneers, and beveling the edges of the frame, whereby a frame will be produced with the edges of the veneers exposed upon all four sides of the frame, as set forth.

ANDREW B. BAUGHART.
CHAS. H. TREAT.

Witnesses:
SAMUEL H. LAYTON,
JOHN H. LAYTON.